United States Patent Office 3,257,091
Patented June 21, 1966

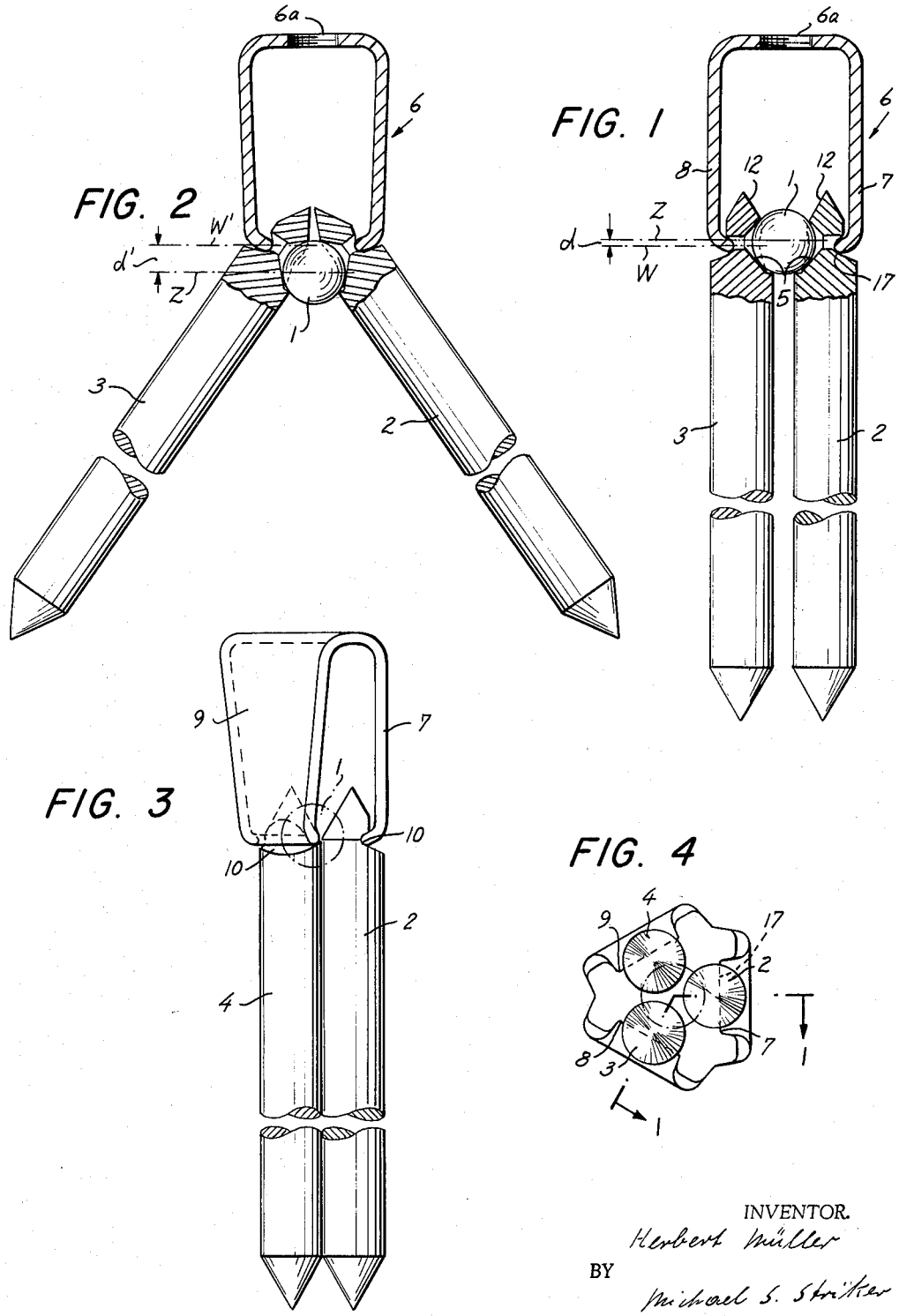

3,257,091
JOINT CONSTRUCTION, PARTICULARLY FOR TRIPOD STANDS
Herbert Müller, Porcheweg 1, Friedrichshafen, Germany
Filed Aug. 21, 1963, Ser. No. 303,530
Claims priority, application Germany, Aug. 21, 1962, M 53,963
8 Claims. (Cl. 248—169)

The present invention relates to a joint construction which is particularly suited for a plurality of interconnected rods which are to be turned relative to each other between angularly spaced positions, and more particularly to a joint construction provided at the head of a tripod stand of the type used, for example, for photographic cameras.

It is desirable to move the supporting legs of a stand rapidly between a closely spaced position to a supporting position in which the legs are substantially spread to provide a broad base for an object supported on the head of a stand.

A particularly stable support is achieved if the number of supporting legs is three, or a multiple of three, and when the supporting legs are slanted the same angle to a perpendicular line at the center, and are spaced the same angular distance from each other.

In accordance with prior art constructions, the joints of stands, such as tripod stands, are constructed so that each supporting leg is individually movable between various angular positions, and can be arrested in a selected angular position. The joint provided at the head of the stand is a universal joint permitting complete freedom of movement of each supporting leg.

While the prior art constructions permit the adjustment of the stand to any possible desired position, there is the disadvantage that each supporting leg has to be individually handled and set in order to place all supporting legs in a desired position. Furthermore, the necessary arresting devices are frequently damaged, and the manufacturing cost of the stand is comparatively high due to the many parts necessary for the head joint.

It is one object of the present invention to overcome the disadvantages of stands according to the prior art, and to provide a stand, particularly a tripod stand, of extremely simple construction which will reliably operate for a long period of time and will be extremely resistant to any damage, even if roughly handled.

Another object of the invention is to provide a stand having a plurality of supporting legs which simultaneously move between a closely spaced angular position and a farther spaced angular position when only one of the supporting legs is turned relative to the head joint.

Another object of the invention is to provide a stand which automatically assumes either an inoperative position in which the supporting legs are folded or a supporting position in which the supporting legs define a selected angle with each other and with a vertical line passing through the head joint.

Another object of the invention is to provide a tripod stand whose supporting legs resiliently snap either into a folded position or into a uniformly angularly spaced supporting position.

Another object of the invention is to provide a simple joint for a stand which has a single bearing member supporting the end portions of all supporting legs for sliding movement during turning of the supporting legs.

Another object of the invention is to provide a stand whose supporting legs are held together by single resilient means so that the assembly of the stand is particularly easy.

With these objects in view, the present invention relates to a joint construction, particularly suited for a stand such as a tripod.

One embodiment of the invention comprises a plurality of members, such as supporting legs, connected to each other for angular movement between a first terminal position defining a smaller angle, an intermediate position, and a second terminal position defining a greater angle with each other; and a resilient means engaging portions of said members for urging the same toward each other.

In accordance with the present invention, the aforesaid portion of each member is located on one side of the center of the turning movement in the first terminal position and on the other side of the center in the second terminal position. In the intermediate position of the members, the respective portions are farther spaced from each other than in the terminal positions.

Consequently, the respective portions move apart during movement from any one of the terminal positions to the intermediate position, and move toward each other during movement from the intermediate position to any one of the terminal positions.

Since the resilient means urges the respective portions toward each other, the aforesaid members are urged to move to one or the other of the terminal positions when moved beyond the intermediate position. The resilient means also hold the members in either terminal position.

Since the resilient means connects the members to each other, all members move simultaneously when one of the members is turned about the joint center, and all members simultaneously assume either one or the other terminal position.

In the preferred embodiment of the invention, the principle is applied to a tripod stand having three supporting leg members whose end portions are in sliding contact with a spherical ball about whose center the supporting leg members turn simultaneously between the two terminal positions. The resilient means has the form of a head member with three pretensioned resilient fingers respectively engaging outwardly facing grooved portions on the end portions of the supporting leg members. The pretensioned resilient fingers exert an inwardly directed pressure on the grooved portions so that all supporting leg members are resiliently urged to move simutaneously and together to one or the other terminal position when moved by the operator beyond the intermediate dead center position in which the resilient force is directed toward the center of the spherical ball, and consequently exerts no turning moment on the supporting legs.

In the preferred embodiment of the invention, the end portions have tapered abutment faces which abut each other in the spread terminal position of the supporting leg members to make the stand completely rigid during actual use.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a front elevation, partially in section along the line 1—1 of FIG. 4 and illustrating a first terminal position of the device;

FIG. 2 is a front elevation, partially in section illustrating a second terminal position of the device;

FIG. 3 is a front elevation of the device in the first terminal position; and

FIG. 4 is a bottom view of the device shown in FIG. 3.

A central spherical steel ball 1 is provided as a joint element for joining the three support members 2, 3 and 4. Each support member has conical inwardly facing recesses 5 in sliding engagement with the outer spherical bearing surface of ball 1. Outwardly facing grooved portions 10 are disposed on the end portions of support members 2, 3, 4 opposite conical recesses 5. The ends of the support members are provided with tapered abutment faces 12.

A resilient means in the form of a head member 6 holds the three support members together. Head member 6 has a top plate of substantially hexagonal shape outline from which three integral resilient fingers 7, 8, 9 project downwardly. Each resilient finger has at the end thereof an inwardly curved end portion terminating in a straight edge 17 abutting the corresponding straight bottom of the respective grooved portion 10. Fingers 7, 8, 9 are pretensioned so as to exert an inward pressure on the grooved portions 10 in the position of FIG. 1 and in the position of FIG. 2.

In the collapsed terminal position of FIG. 1 in which the support members, or supporting legs 2, 3, 4, define the smallest angle with each other and are, for example, parallel, the resilient force is exerted in a plane W which is parallel to and located on one side of the plane Z which passes through the center of the joint ball 1. The distance between the planes W and Z is small $d$. In the spread terminal position of the supporting members, shown in FIG. 2, the resilient force is exerted by the resilient fingers 7, 8, 9 in a second plane W' which is located on the other side of the central plane Z and spaced a distance $d'$ from the same. The distance $d'$ is greater than the distance $d$.

In the position shown in FIGS. 1 and 3, the inwardly directed resilient forces exerted by the pretensioned resilient fingers 7, 8, 9 will exert a turning moment on support members 2, 3, 4 which is proportional to the distance $d$. The support members will be urged to turn to the folded terminal position in which they may abut each other.

Assuming that one of the support members is turned to an intermediate position, not shown, in which the inwardly directed forces act in the plane Z, the other support members are taken along, turning outwardly through the same angle as the operated support member since all support members are connected by the head member 6. When the operator turns any one support member beyond the intermediate dead center position, the inwardly directed forces will again exert a turning moment in the opposite direction, urging the ends with the abutment faces 12 toward each other, and a final turning moment proportional to the distance $d'$ will be exerted on the support members in the spread terminal position shown in FIG. 2.

It is evident that whenever the operator moves one of the support members beyond the dead center position, all support members will tend to assume the respective terminal position. The resilient fingers 7, 8, 9 are pretensioned to such an extent that the support members are held in either terminal position without any additional arresting means, a certain manual force being required for spreading the resilient fingers during turning of the support members from one terminal position to the other terminal position. However, the operator has to exert manual force only until he has moved the support members beyond the dead center position in which the edges 17 of the resilient fingers are farthest spaced from each other.

In the illustrated embodiment, the end portions of the resilient fingers are located in the same plane so that all three support members are spaced the same angle from a vertical line passing through the center of ball 1 in any turned position of the support members. In the event that the grooved portions 10 are located staggered relative to each other along the length of the end portions of the support members, the latter will be spaced different angular distances from the vertical line of symmetry.

While the head member has been described to partly envelop the ends of the support members, a pretensioned resilient ring located in the grooves 10 would have the same effect and cause members 2, 3, 4 to snap from either terminal position to the other terminal position when moved beyond the dead center position in which the resilient ring is located in the plane Z.

The central joint element is not necessarily a spherical ball, and a differently shaped joint element may be provided with circular bearing faces permitting turning movement of the support members. The bearing faces may be concave or convex and cooperate with corresponding convex or concave surfaces on the end portions of the support members. The construction in which a spherical ball is preferred because it can be economically manufactured and assures a very reliable operation. It is possible to secure one of the support members to the central joint element so that only the other support members slide on the same during simultaneous movements of the support members.

It will be understood that each of the elements described above, or two or more together, may also find a useful application in other types of joint constructions differing from the types described above.

While the invention has been illustrated and described as embodied in a tripod stand in which the supporting legs are resiliently pressed against a spherical joint element.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A joint construction comprising three elongated support members having end portions supported for angular movement about a center between a first terminal position defining a smaller angle, an intermediate position, and a second terminal position defining an angle greater than said smaller angle, with each other, said end portions having outwardly facing portions formed with grooves and located in said first terminal position on one side of said center and in said second terminal position on the other side of said center, and in said intermediate position in a common plane with said center and spaced farther from each other than in said terminal positions so that said outwardly facing portions move apart during turning movement of said members from any one of said terminal positions to said intermediate position and move toward each other during turning movement of said members from said intermediate position to any one of said terminal positions, said end portions of said support members being nearer to each other in said second terminal position than in said first terminal position; and a head member having a plurality of pretensioned resilient fingers respectively engaging said grooves of said outer surface portions for urging said outer surface portions toward each other so as to move said members simultaneously to one or the other of said terminal positions when any one member is moved beyond said intermediate position, and to hold said members in either terminal position, said head member enveloping at least partly said end portions of said elongated support members and being adapted to support an object when said elongated support members in said second terminal position rest on the other end portions thereof.

2. A stand comprising a central joint element having a plurality of circular outer bearing surface portions angularly spaced from each other in a plane; a plurality of elongated support members angularly spaced from each other in said plane, and having end portions with recessed inwardly facing surfaces in sliding contact with said outer bearing surface portions so that each support member is turnable about a center between a first terminal position in which said support members define smaller angles with each other, an intermediate position, and a second terminal position in which said support members define angles with each other which are greater than said smaller angles, said end portions of said support members having outwardly facing grooved portions located in said terminal position on one side of said plane and center, and in said second terminal position on the other side of said plane and center, and in said intermediate position in said plane and spaced farther from each other than in said terminal positions so that said outwardly facing grooved portions move apart during movement of said support members from any one of said terminal positions to said intermediate position and move toward each other during turning movement of said members from said intermediate position to any one of said terminal positions; a head member having a plurality of pretensioned resilient fingers respectively engaging said grooved portions for urging the same toward each other so as to move said members simultaneously to one or the other of said terminal positions when any one member is moved beyond said intermediate position, and to hold said members in either terminal position, said head member enveloping at least partly said end portions of said support members and being adapted to support an object when said support members in said second terminal position rest on the other end portions thereof.

3. A stand comprising a central joint element having a plurality of circular outer bearing surface portions angularly spaced from each other in a plane; a plurality of elongated support members angularly spaced from each other in said plane, and having end portions in sliding contact with said outer bearing surface portions so that each support member is turnable about a center between a first terminal position in which said support members define smaller angles with each other, an intermediate position, and a second terminal position in which said support members define angles with each other which are greater than said smaller angles, said end portions of said support members having outwardly facing portions located in said terminal position on one side of said plane and center, and in said second terminal position on the other side of said plane and center, and in said intermediate position in said plane and spaced farther from each other than in said terminal positions so that said outwardly facing portions move apart during movement of said support members from any one of said terminal positions to said intermediate position and move toward each other during turning movement of said members from said intermediate position to any one of said terminal positions; and resilient means mounted on said outwardly facing portions for urging the same toward each other so as to move said members simultaneously to one or the other of said terminal positions when any one member is moved beyond said intermediate position, and to hold said members in either terminal position.

4. A stand comprising a central spherical ball having a center; elongated support members angularly spaced from each other equal angles in a plane passing through said center and having end portions with recessed inwardly facing surfaces in sliding contact with said ball so that said support members are turnable about said center between a first terminal position in which said support members define smaller angles with each other and with a line of symmetry passing through said center perpendicularly to said plane, an intermediate position, and a second terminal position in which said support members define angles with each other and with said line of symmetry which are greater than said smaller angles, said end portions of said support members having outwardly facing grooved portions located in said terminal position on one side of said plane and center, and in said second terminal position on the other side of said plane and center, and in said intermediate position in said plane and spaced farther from each other than in said terminal positions so that said outwardly facing grooved portions move apart during movement of said support members from any one of said terminal positions to said intermediate position and move toward each other during turning movement of said members from said intermediate position to any one of said terminal positions; a head member having three pretensioned resilient fingers respectively engaging said grooved portions for urging the same toward each other so as to move said members simultaneously to one or the other of said terminal positions when any one member is moved beyond said intermediate position, and to hold said members in either terminal position, said head member enveloping at least partly said end portions of said support members and being adapted to support an object when said support members in said second terminal position rest on the other end portions thereof.

5. A tripod stand as set forth in claim 4 wherein said inwardly facing surfaces of said end portions are conical.

6. A tripod stand as set forth in claim 4 wherein said end portions of said support members have at the ends thereof tapered abutment faces abutting each other in said second terminal position.

7. A tripod stand as set forth in claim 4 wherein said head member has a top plate disposed to be substantially parallel to said plane and wherein said three resilient fingers are plates integral with said top plate and projecting perpendicularly to the same, said resilient fingers having inwardly curved end portions resiliently abutting said grooved portions.

8. A tripod stand as set forth in claim 4 wherein said grooved portions are located in said first position of said support members in a common plane parallel to and on one side of said plane and spaced from the same a first distance, and are located in said second position of said support members in another common plane parallel to and on the other side of said plane and spaced from the same a second distance greater than said first distance.

References Cited by the Examiner
UNITED STATES PATENTS

| | | | |
|---|---|---|---|
| 455,345 | 7/1891 | Lovejoy | 248—168 |
| 630,220 | 8/1899 | Hayes | 248—188 |
| 1,967,965 | 7/1934 | Morehouse et al. | 24—252 |
| 2,261,005 | 10/1941 | Thompson et al. | |
| 2,540,722 | 2/1951 | Gardner | 24—137.5 |
| 2,828,097 | 3/1958 | Faunce | 248—169 |

FOREIGN PATENTS

| | | |
|---|---|---|
| 2,722 | 2/1904 | Great Britain. |
| 18,629 | 11/1893 | Great Britain. |
| 492,615 | 9/1938 | Great Britain. |

CARL W. TOMLIN, *Primary Examiner.*

D. W. AROLA, I. B. TALTON, *Assistant Examiners.*